United States Patent Office 2,762,231
Patented Sept. 11, 1956

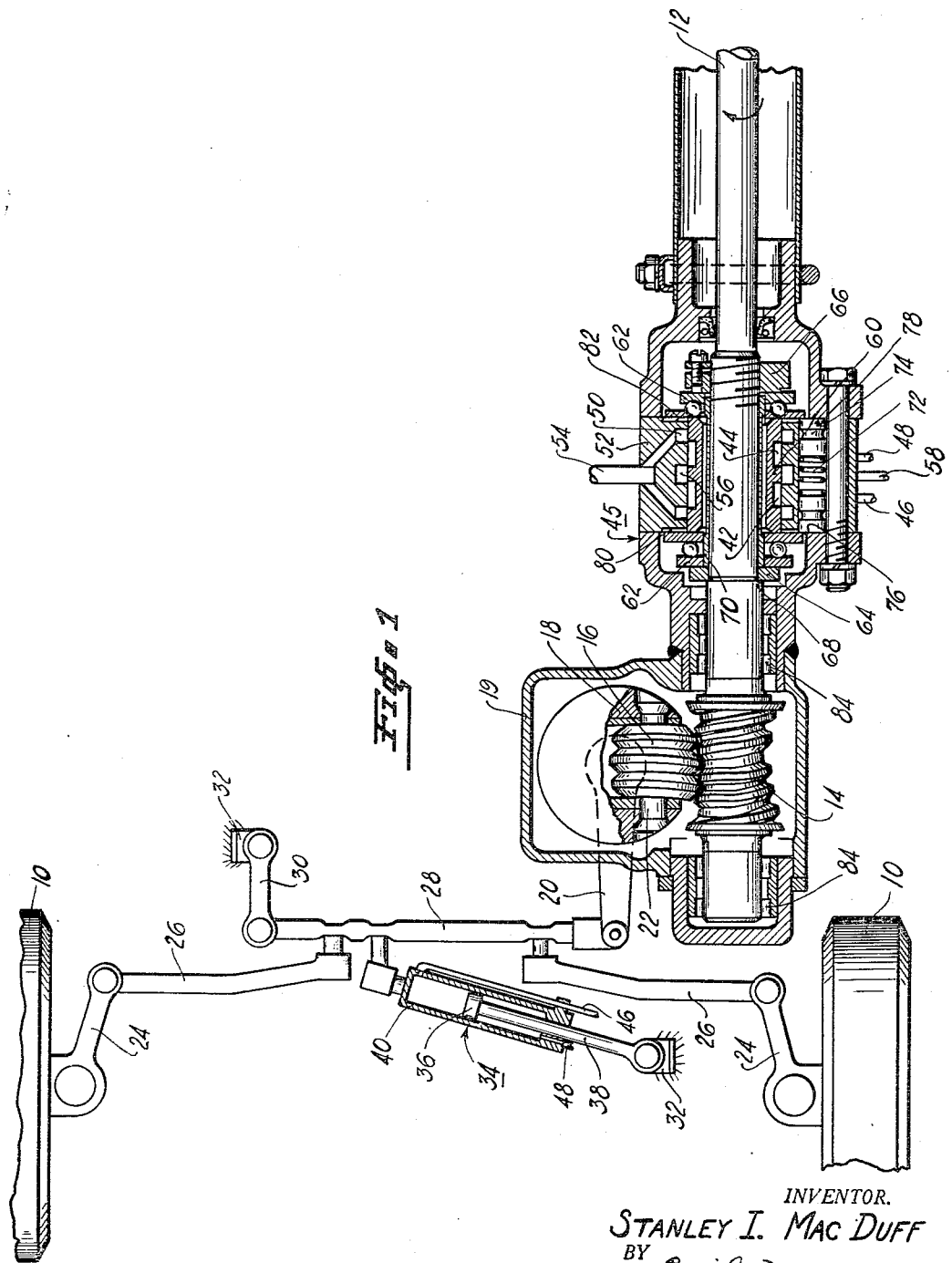

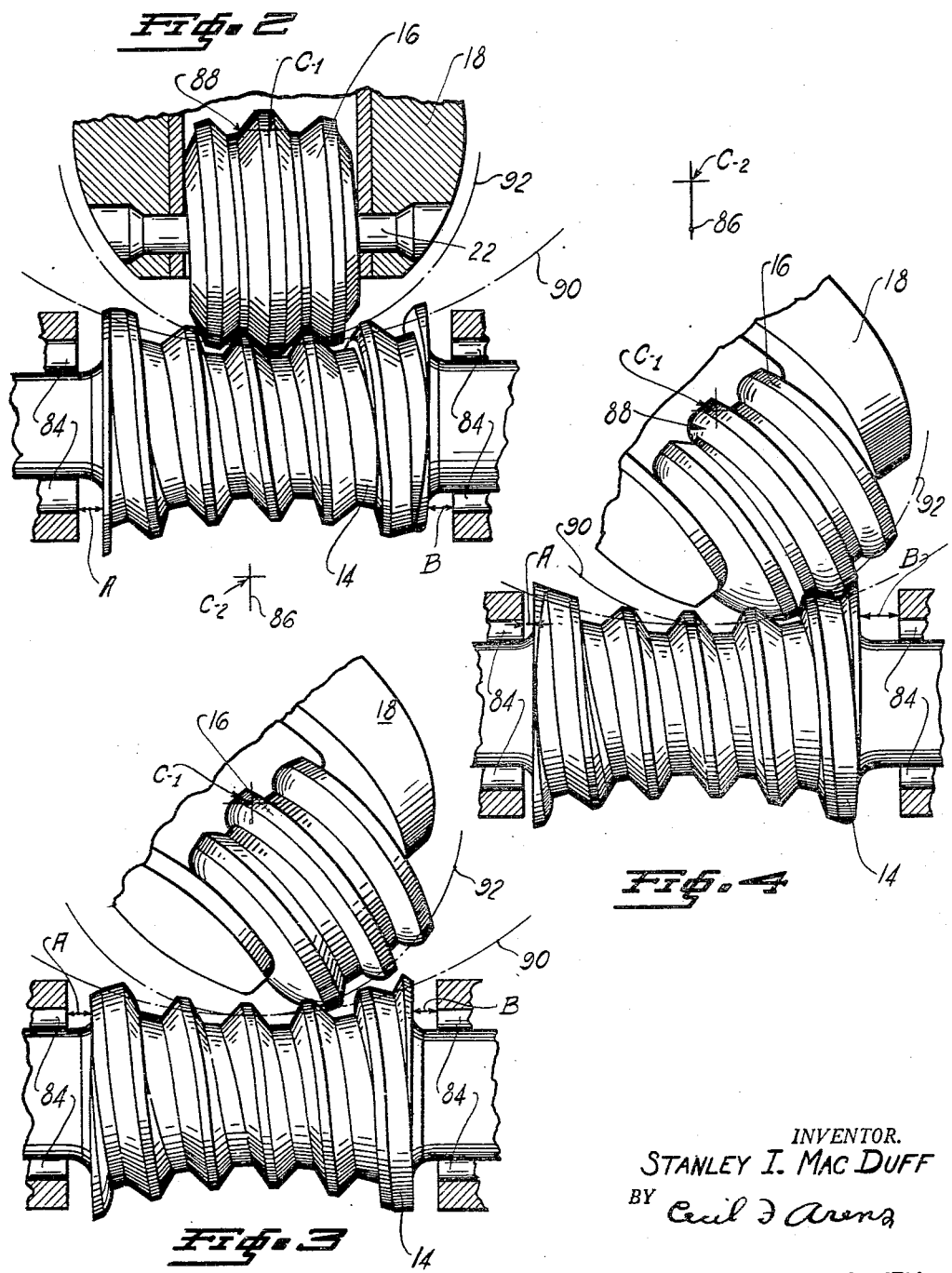

2,762,231

POWER STEERING APPARATUS

Stanley I. MacDuff, South Bend, Ind., assignor to Bendix Aviation Corporation, South Bend, Ind., a corporation of Delaware Application August 14, 1953, Serial No. 374,176

13 Claims. (Cl. 74—388)

This invention concerns improvements in steering gear, and more particularly a power steering mechanism for land vehicles. The invention is especially adapted for use with vehicles employing a steering gear of the type having an hour-glass worm fixed to the steering shaft for driving cooperation with a roller gear pivotally carried adjacent said worm and in meshing relationship therewith for rotation about a fixed center.

It is a purpose of the present invention to introduce improvements in power steering mechanisms employing an hour-glass worm fixed to the steering shaft.

It is an object of this invention to combine an hour-glass worm mounted for axial movement from a center position with a roller sector gear in a manner such that the centers of the pitch radii of the gears normally lie in the same plane but with the center of the pitch radius of the worm gear shiftable into a different plane when there is a force resisting rotation of the roller gear sector about the center of its pitch radius.

A still further object of the invention resides in the provision of an axially displaceable hour-glass worm gear constructed and arranged to mesh closely with a roller sector gear when the latter is at the throat of said worm gear and to fit loosely therewith when the roller gear sector is in mesh with said worm at either side of said throat whereby axial displacement of said worm may take place without interference between said gears.

The above and other objects and features of the invention will be apparent from the following description of the apparatus taken in connection with the accompanying drawings which form a part of this invention and in which:

Figure 1 is a view in longitudinal section of the steering gear of the invention associated with a vehicle; and Figures 2, 3 and 4 represent enlarged views of the worm and sector gears in different positions.

Referring now to Figure 1, the reference numeral 10 designates the front wheels of a vehicle to be steered by rotation of a steering shaft 12 on one end of which is mounted a worm gear 14 of the hour-glass type. A roller sector gear 16 is arranged in meshing relationship with the worm gear and is carried by one end of a rock shaft 18, to the other end of which a pitman arm 20 is secured. The rock shaft is properly journaled in housing 19. The roller sector gear 16 is rotatably carried on a pivot pin 22 supported at one end of the rock shaft 18. The roller sector gear is swingable about the axis of the rock shaft as a center which also represents the center of the pitch radius of the roller gear. The pitman arm 20 is connected to the steering knuckle arms 24 of the wheels 10 through a steering linkage assembly comprising right and left reach rods 26, a cross link 28, and an idler arm 30 suitably pivoted at one end to a vehicle frame 32. Thus far the description concerns the steering parts involved for conventional manual steering of a vehicle employing an hour-glass worm and roller sector gear. Except for the differences in construction to be hereinafter pointed out in more detail a steering gear of this general type employing an hour-glass worm and roller sector gear is known in the industry as a "Marles Gear." In the standard or conventional "Marles Gear" the shaft on which the worm gear is mounted is held against axial displacement by thrust bearings which are located at each side of the worm, as best shown in Patents 1,642,164 and 1,720,911. It will also be observed that the roller sector gear and worm gear of Patent 1,720,911 have the same pitch radii.

This manual steering gear or "Marles Gear" is herein combined with a hydraulic system to provide a power steering mechanism wherein a fluid motor 34 is connected between the cross link 28 and the vehicle frame 32. The fluid motor 34 includes a piston 36, a piston rod 38, connected to the vehicle frame 32, and a cylinder 40 suitably attached to the cross link 28. The piston 36 divides the cylinder 40 into opposed chambers constantly communicating respectively with annular channels 42 and 44 of a control valve 45, via conduits 46 and 48. Annular channels 50, located in the interior of valve housing 52 open into a common line 54 communicating with a fluid reservoir, not shown. Annular channel 56 formed interiorly of the housing 52 communicates with an inlet conduit 58 adapted to be connected to a fluid pressure source, not shown. The annular channels 42 and 44 are located in the exterior of sleeve 60 which is concentric with the steering shaft 12 and confined between ball bearing races 62. These ball bearing races abut respectively the washer 64 and nut 66. The washer 64 is in turn in engagement with a shoulder 68 of the steering shaft. The nut 66 holds this entire assembly comprising parts 60, 62 and 64 fixed with respect to axial movement of the steering shaft. A tubular member 70 is arranged concentrically of the steering shaft and interposed between the latter and the sleeve 60. The sleeve cannot rotate with the steering shaft but can shift axially with the shaft. The annular channels 42 and 44 are located between the inlet channel 56 and the annular channels 50 and overlap the edges of channels 50 and 56 when the sleeve 60 is in neutral position. In neutral position fluid entering inlet channel 56 can flow freely into channels 42 and 44 from whence the fluid passes into the channels 50 communicating with the reservoir, not shown. This arrangement of the valve to continuously circulate fluid through the system results in low pressures throughout the system and with only light pump loads. Axial displacement of the sleeve 60 in either direction from neutral position will increase the overlap between the inlet channel 56 and one of the channels 42 and 44 and decrease the overlap between the inlet channel 56 and the other of the channels 42 and 44. This axial displacement of the sleeve as aforementioned simultaneously increases the overlap between one of the channels 42 and 44 and one of the channels 50 and decreases the overlap between the other of the channels 42 and 44 the other of the channels 50. This causes fluid pressure to build up in one of the channels 42 and 44 and the end of the cylinder communicating with said one channel. The overlap between the other of the channels 42 and 44 and one of the channels 50 is increased, thus providing for the free discharge of fluid from that end of the cylinder communicating with the said other of the channels 42 and 44.

The sleeve 60 is yieldingly held in its neutral position by a precompressed spring 72, arranged between adjacent ends of coaxially disposed plungers 74, the remote ends of which abut shoulders 76 and 78 of the valve housing, and the ball bearing races 62. Actually there are a plurality of plungers and springs positioned around the steering shaft but only one such arrangement is shown. The ends of the valve housing 52 are recessed at 80 and 82 to receive the bearing races 62 when the sleeve 60 and shaft are moved axially. It is evident that any movement axially of the steering shaft must first overcome the spring 72. The type of valve used is illustrative only and forms no part of the invention except as an element of the combination where claimed.

One of the main points of the invention resides in the construction and arrangement of the hour glass worm 14 and the roller sector gear 16 so that axial displacement of the steering shaft 12 can take place without interference between these gears. The steering shaft 12 is rotatably supported for axial movement on radial bearings 84 located on each side of the worm 14. For straight ahead position of the wheels 10 the roller sector gear 16 is normally positioned at the throat or mid position of the worm gear, see Figures 1 and 2. In this center position of the roller gear, as shown in Figures 1 and 2, the pitch radii 86 and 88 of the worm and roller gears respectively normally lie in the same plane. The pitch radii of the gears 14 and 16 are unequal and their pitch circles 90 and 92 are tangent at the throat or mid position of the worm gear. With the gears in the position of Figure 2 contact pressure between the gear teeth is substantially along the pitch circles of gears. In this position of the gears there is a close fit between the gear teeth. However, when the roller sector gear is rotated in either direction from this mid position the teeth of the respective gears fit loosely, thus creating backlash between the gears. This backlash permits axial displacement of the worm without interference between the gears.

With reference to Figure 3 it will be observed that because the worm gear is cut to mesh with a roller sector gear having a pitch radius greater than the pitch radius 88 of the roller gear 16, rotation of the roller sector gear 16 about center $C_1$ away from the mid position will shift the contact pressure from along the pitch circles of the gears to a point on the worm gear between the pitch circle and the addendum circle. The pitch radii of the two gears 14 and 16 are so related that during non-steering of the wheels 10 the pitch centers $C_1$ and $C_2$ of the pitch radii 88 and 86 are in the same plane. During steering, that is, upon rotation of steering shaft 12, the resistance offered by the wheels 10 to turning is transmitted as a force to the rock shaft 18, which reacts on the worm gear 14 to shift the center of the pitch radius of said worm gear out of said plane (see Figure 4), to thereby shift the sleeve 60 away from its neutral position. This axial shift of the worm becomes evident upon inspection of Figures 2, 3, and 4. In Figures 2 and 3, the worm is substantially centrally located between the bearings 84 as represented by the distances A and B between the worm gear and the respective bearings 84. In Figure 4, the distance B has been increased since the worm and shaft have shifted to the left as a result of the resistance offered to rotation of the sector gear about the center $C_2$. Fluid pressure now acts in the fluid motor 34 in such a manner to cause the rock shaft to be rotated in a direction to return the center $C_2$ to the plane containing $C_1$ (see Figure 3), and in so doing returns the sleeve 60 to its neutral position.

Operation of the steering mechanism is as follows:

Assume a condition of non-steering with the wheels 10 straight ahead. The parts of the system are in the position represented by Figures 1 and 2 at this time. Fluid under pressure existing in the inlet channel 56 divides equally between the channels 42 and 44, communicating with opposite ends of the cylinder 40. From the channels 42 and 44 the fluid flows into the channels 50 and thence into the common return 54. You might say that the system is in a state of balance at this time.

Now assume a condition of steering to the right, which would be the equivalent of turning the wheels 10, of Figure 1, clockwise about their king pin axes. In order to turn the wheels in this manner the steering shaft 12 is rotated in the direction of the arrow. If the resistance to turning the wheels is greater than the resistance offered to axial displacement of the shaft (which is always the case under normal steering conditions) the latter will be displaced to the left, see Figure 4, thus increasing the overlap between inlet channel 56 and channel 44, the latter channel communicating with the lower end of the cylinder 40 via the conduit 48. Pressure in the lower end of the cylinder is thereby increased. The upper end of the cylinder communicates with the channel 42 by way of conduit 46. It will be noted that the overlap of the channel 42 on the channel 50 on the left has increased thus permitting relatively free flow from the upper end of the cylinder to the conduit 54. This differential in pressure in the ends of cylinder 40 and acting on opposite sides of the piston 36 rotates the pitman arm 20 through link 28 in a counterclockwise direction, thus returning the worm gear and shaft to the right, as shown in Figure 3 to thereby provide followup. The sleeve 60, which had been shifted to the left, is returned to the position of Figure 1.

Although the invention has been described in connection with certain specific embodiments, the principles are susceptible of numerous other applications that will readily occur to persons skilled in the art.

Having thus described the various features of the invention, what I claim as new and desire to secure by Letters Patent is:

1. In a power steering mechanism, a steering shaft mounted for rotation and axial movement and having a worm gear of the hour-glass type fixedly carried thereon, said shaft having a center position from which it is shiftable in either direction, a roller sector gear arranged to mesh with said worm gear, a rock shaft on which said roller sector gear is mounted for swinging about said rock shaft as an axis, a fluid motor, a control valve means operatively connected to said steering shaft and actuable by axial movement of said shaft, and fluid connections from said valve means to said fluid motor, said worm gear and roller sector gear being so related that when the steering shaft is in center position and said roller gear sector is located at the throat of said worm gear the gears fit closely and when the roller gear is located on either side of said throat there is substantial backlash between the gears whereby axial movement of the steering shaft from its center position is effected without interference between said gears.

2. A steering gear of the character defined in claim 1 wherein the rock shaft is connected to the fluid motor for returning the steering shaft toward its center position after a steering application.

3. In a power steering mechanism the combination with a worm gear of the hour-glass type mounted for limited axial movement, of a fluid motor, a valve means controlled by axial movement of said worm and controlling the supply of fluid within said motor, connections from the valve means to the fluid motor, a rock shaft, and a roller gear element carried by the rock shaft and meshing with the worm, the gears being of such a construction and arrangement that the pitch radius of the worm gear is greater than the pitch radius of the roller gear element and the pitch circles are tangent when the roller gear element is in contact with the worm gear at its throat.

4. In a power steering mechanism the combination with the worm gear of the hour-glass type mounted for limited axial motion, of a fluid motor, a valve means controlled by axial motion of said worm gear and controlling the supply of fluid within said motor, connections from the valve means to the fluid motor, a rock shaft, and a roller gear carried on the rock shaft in meshing relationship with said worm gear and having a mid position thereon from which the roller gear is shiftable in either direction, the gears having a relationship such that contact pressure between the gears is along the pitch circle of the gears when the roller gear is in said mid position of said worm gear and when said roller gear is out of said mid position contact pressure on the worm gear is between the pitch circle and the addendum of said last named gear thus providing backlash in all positions out of said mid position to permit axial movement of said worm gear.

5. In a power steering mechanism the combination with a worm of the hour-glass type mounted for limited axial movement, of a fluid motor, a valve means operatively connected to said worm to respond to axial movement thereof for controlled fluid under pressure within said motor, connections from the valve means to the fluid motor, a rock shaft, and a roller gear drivably related to said worm gear and carried on the rock shaft and swingable about the axis of the latter, the pitch radii of the pitch circles of the gears being unequal and their centers normally lying in the same plane, the pitch circles of the gears being so related that when there is a force resisting rotation of the rock shaft said center of the pitch radius of said worm gear shifts out of said plane.

6. In a power steering mechanism the combination with a rotatable steering shaft on which a worm gear of the hour-glass type is mounted for receiving a force opposing rotation of said shaft and for converting said force into axial motion of said shaft, of a fluid motor, a valve means actuable by axial movement of the shaft to control fluid pressure in said motor, connections from the motor to said valve means, a rock shaft, a gear element carried by the rock shaft for engagement with said worm gear, the pitch radii of the pitch circles of the gears being unequal and with their centers normally lying in the same plane, the pitch circles of the gears being so related that when there is a force resisting rotation of the rock shaft said center of the pitch radius of said worm gear shifts out of said plane, and means operatively connecting said fluid motor to said rock shaft to relieve said worm gear of the resistive force.

7. In a power steering mechanism the combination with a rotatable steering shaft on which a worm gear of the hour-glass type is mounted for receiving a force opposing rotation of said shaft and for converting said force into axial motion of said shaft, of a fluid motor, a valve means operatively connected to said shaft for actuation by the shaft upon axial movement thereof for controlling fluid pressure within said motor, connections from the valve means to said motor, a rock shaft, and a roller gear drivably related to said worm gear and supported by the rock shaft and swingable about the axis of the latter, the meshing arrangement of the gears being such that the centers of the pitch radii of the pitch circles lie in the same plane when the force resisting steering is one value and lie in different planes when the force resisting steering is a second value.

8. In a steering gear, an hour-glass worm having limited axial movement in either direction from a central position, and a roller sector gear in mesh with the worm gear and arranged so that when the worm gear is held in said center position and said roller gear is positioned at the throat of said worm gear the gears mesh closely and when the roller gear is positioned on either side of the throat of said worm gear there is substantial backlash therebetween, and axial movement of said worm gear from its center position when said roller sector gear is positioned on either side of center is effected without binding between said gears.

9. In a steering gear, a roller sector gear having a given radius of operation, an hour-glass worm mounted for limited axial movement and arranged in meshing relationship to said roller sector gear, said worm being cut to mesh with a roller sector gear having a larger radius than the roller sector gear with which it actually meshes, the roller sector gear and worm gear being so constructed and arranged that when they are adjusted to have a closely rolling contact at the throat of the worm gear any axial movement of the latter gear will allow no more than normal full depth tooth engagement without interference when the roller sector gear is in contact with the worm gear on either side of the throat.

10. In a steering gear, an hour-glass worm mounted for limited axial displacement, a roller sector gear arranged to mesh closely with said worm when positioned at the throat of said worm and loosely with said worm when positioned on either side of the throat whereby axial displacement of the worm is effected without interference between the gears, and means for producing axial displacement of said worm.

11. In a power steering gear, an hour-glass worm having limited axial movement in either direction from a center position, a roller gear in mesh with the worm gear and arranged with respect thereto so that when the worm gear is in said center position and said roller gear is positioned at the throat of said worm gear the gears mesh closely and when the roller gear is positioned on either side of the throat of said worm gear there is substantial backlash therebetween, manual means for producing axial movement of the worm gear away from its center position, and hydraulic power means connected to said roller gear and actuable by axial movement of said worm gear for returning said worm to its center position.

12. In a power steering mechanism, a steering shaft, radial bearings in which said shaft is rotatably mounted for axial movement, an hour-glass worm gear integrally related to said shaft, a roller sector gear arranged in meshing relationship with said worm gear and having a smaller pitch radius than the pitch radius of the worm gear, a rock shaft on which said roller sector gear is mounted for swinging about said rock shaft as an axis, a fluid motor, a control valve, fluid connections between said valve and motor, said valve being connected to said steering shaft and actuable by axial movement of said worm gear and steering shaft, thereby controlling the supply of fluid within said motor, said worm gear and roller sector gear having a relationship such that in the mid or throat position of the worm gear the gear teeth fit closely with the contact pressure being substantially along the pitch circles of the gears, rotation of the roller sector gear to either side of the worm throat shifting the contact pressure from along the pitch circles of the gears to a point on the worm gear between the pitch circle and the addendum circle causing the teeth of the respective gears to fit loosely, thus creating backlash between the gears which permits axial displacement of the worm without interference between the gears, said gears being arranged so that their pitch radii lie in the same plane in the throat position but in different planes when forces resisting rotation of the rock shaft cause the worm gear to shift axially.

13. In a steering gear, an hour glass worm gear, radial bearings located on each side of said worm gear and on which said worm gear is mounted for limited axial movement, a roller sector gear having a smaller pitch radius than the pitch radius of the worm gear and cut to mesh with said worm gear, said worm gear and roller sector gear being so related that when the roller sector gear is located at the throat of said worm gear the contact pressure between the gear teeth is substantially along the pitch circles of the gears, the pitch radii lie in the same plane, and the respective gears fit closely, and when the roller sector gear is located on either side of said throat the contact pressure shifts to a point on the worm gear between the pitch circle and the addendum circle, the pitch radii lie in different planes, and the respective gears fit loosely, thereby creating backlash between the gears which permits axial displacement of the worm without interference between the gears.

References Cited in the file of this patent

UNITED STATES PATENTS

| | | |
|---|---|---|
| 1,876,795 | Trbojevich | Sept. 13, 1932 |
| 2,213,271 | Davis | Sept. 3, 1940 |